United States Patent [19]

Hirata et al.

[11] Patent Number: 4,665,119

[45] Date of Patent: May 12, 1987

[54] RUBBER COMPOSITION

[75] Inventors: Yasushi Hirata, Sayama; Hitoshi Kondo, Higashimurayama; Masanao Kono; Yasuyoshi Sanada, both of Kakogawa, all of Japan

[73] Assignees: Bridgestone Corporation, Tokyo; Harima Chemicals, Inc., Hyogo, both of Japan

[21] Appl. No.: 850,308

[22] Filed: Apr. 10, 1986

[30] Foreign Application Priority Data

Jun. 13, 1985 [JP] Japan ................................ 60-127047

[51] Int. Cl.$^4$ ................................................. C08K 5/09
[52] U.S. Cl. ...................................... 524/399; 524/571
[58] Field of Search ................................ 524/399, 571

[56] References Cited

U.S. PATENT DOCUMENTS

| | | | |
|---|---|---|---|
| 3,903,026 | 9/1975 | Fujimura et al. | 524/396 |
| 4,258,770 | 3/1981 | Davis et al. | 524/274 |
| 4,435,477 | 3/1984 | Davis | 524/274 |
| 4,518,733 | 5/1985 | Ishikawa et al. | 524/274 |

*Primary Examiner*—Joseph L. Schofer
*Assistant Examiner*—N. Sarofim
*Attorney, Agent, or Firm*—Sughrue, Mion, Zinn, Macpeak & Seas

[57] ABSTRACT

A rubber composition in which a metal salt between a resin acid and cobalt is blended in a content of from 0.05 to 0.7 part by weight in terms of the content of a metal element with respect to 100 parts by weight of rubber containing not less than 70% by weight of at least one rubber of natural rubber and a synthetic polyisoprene rubber; as the metal salt is used a cobalt resinate which has a melting point in a range of 140° to 180° C., an oxidation degree of not more than 60% in a gas chromatography (GLC), and not more than 2,000 ppm of a sulfur concentration in the metal salt; when the metal salt is divided into a dissolved portion and an undissolved portion by using toluene and water, the undissolved portion in both toluene and water has a characteristic absorption of around 3,600 cm$^{-1}$ in an infrared absorption spectrum (IR); and when elevated in temperature at a rate of 5° C./min. in a differential scanning calorimeter (DSC), the cobalt resinate has endothermic peaks in ranges of 250° to 350° C. and 300° to 420° C., respectively.

4 Claims, 2 Drawing Figures

RUBBER COMPOSITION

BACKGROUND OF THE INVENTION

1. Field of the Invention

The present invention relates to a rubber composition, more specifically, the invention relates to a rubber composition exhibiting excellent adhesion and heat aging resistance when used as rubber for coating steel cords.

2. Related Art Statement

Recently, there have been remarkably developed so-called steel tires using steel cords in belts and/or carcass plies, and various investigations have been made on the adhesion between the steel cords and the rubber.

In general, the adhesion between the steel cords and rubber is broadly classified in two ways, that is, a method of an RHS adhesion system with resorcinol/hexamethylene tetramine/silica, and another method of blending a metal salt, particularly a cobalt salt of an organic acid, have been known. The latter method has been more widely used, and the rubber compositions blended with such a metal salt have been proposed as the steel cord-coating rubber. For instance, Japanese Patent Publication No. 56-39,828, Japanese Patent Application Laid-open No. 54-52,188, Japanese Patent Publication Nos. 50-33,905, 49-20,072, 52-26,276, and 54-31,511 and Japanese Patent Application Laid-open No. 58-89,631 disclose rubber compositions blended with cobalt naphthenate, cobalt stearate, cobalt oleate, cobalt salt of tall oil acid, cobalt resinate and the like as an adhesive promotor.

In the meanwhile, the demands for the safety, high speed running performance, durability and so on for the automobile tires have been getting larger and larger, and the conventional techniques have not necessarily satisfied such demands. For instance, the cobalt salts blended into the rubber compositions promote the heat aging of the rubber, and among them, cobalt naphthenate extremely decreases the heat aging resistance. Further, cobalt resinate lowers the tackiness in an unvulcanized state, so that the adhesion between the rubber members becomes poorer and problems of the poorer adhesion rises after the vulcanization. In addition, cobalt resinate is generally excellent in the heat aging resistance as compared with cobalt naphthenate. However, upon having made investigations, the present inventors have found that all the cobalt resinates do not necessarily exhibit good performances; some rubber compositions even blended with cobalt resinates exhibit poor adhesion and particularly poor initial stage adhesion, which is the largest shortcoming of the cobalt resinates, and they are not satisfactory in terms of the tire durability.

SUMMARY OF THE INVENTION

It is an object of the present invention to provide a rubber composition which is remarkably improved in terms of the initial stage adhesion and the heat aging resistance, and is extremely usable as rubber for coating steel cords.

Having noted that the cobalt resinate blended into the rubber composition makes less effects upon the heat aging resistance of the rubber as compared with cobalt naphthenate, the present inventors have found out after having made strenuous investigations aiming at the improvements on the initial stage adhesion as the shortcoming of the conventional rubber composition blended with cobalt resinate and further improving the heat aging resistance that the initial stage adhesion of the resulting rubber composition is enhanced and the heat aging resistance is simultaneously improved by blending a specific cobalt resinate into the rubber composition, and then accomplished the present invention.

According to the present invention, there is a provision of a rubber composition in which a metal salt between a resin acid and cobalt is blended in a content of from 0.05 to 0.7 part by weight in terms of the content of a metal element with respect to 100 parts by weight of rubber containing not less than 70% by weight of at least one rubber of natural rubber and a synthetic polyisoprene rubber; as the metal salt is used a cobalt resinate which has a melting point in a range of 140° to 180° C., an oxidation degree of not more than 60% in a gas chromatography (GLC), and not more than 2,000 ppm of a sulfur concentration in the metal salt; when the metal salt is divided into a dissolved portion and an undissolved portion by using toluene and water, the undissolved portion in both toluene and water has a characteristic absorption of around 3,600 $cm^{-1}$ in an infrared absorption spectrum (IR); and when elevated in temperature at a rate of 5° C./min. in a differential scanning calorimeter (DSC), the cobalt resinate has endothermic peaks in ranges of 250° to 350° C. and 300° to 420° C., respectively.

These and other objects, features and advantages of the present invention will be well appreciated upon reading of the invention when taken in connection with the attached drawings with understanding that some modifications, variations and changes of the same could be easily done by the skilled in the art to which the invention pertains without departing from the spirit of the invention or the scope of claims appended hereto.

BRIEF DESCRIPTION OF THE DRAWINGS

For better understanding of the invention, reference is made to the attached drawings, wherein.

DETAILED DESCRIPTION OF THE INVENTION

Figure 1:
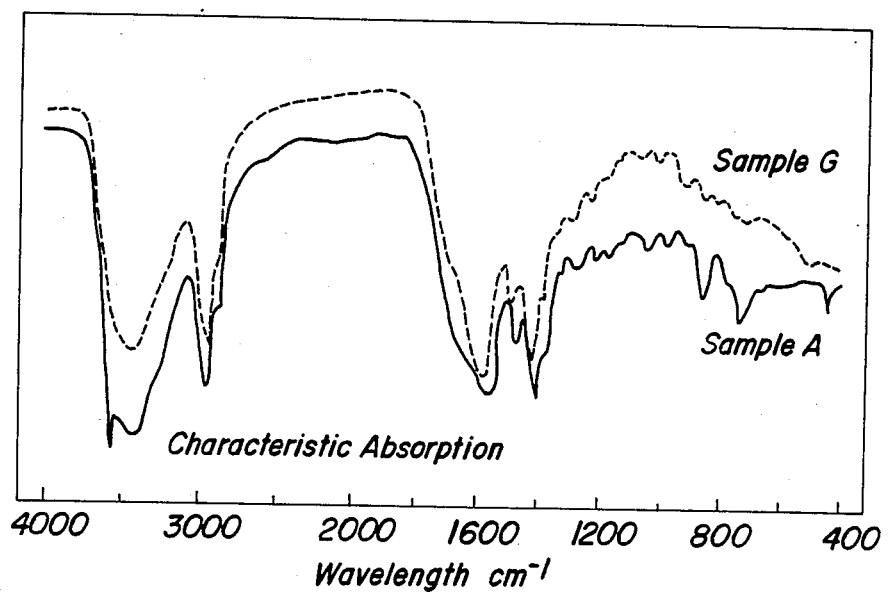
FIG. 1 is an IR spectra of Sample A and Sample G.

The present invention will be explained more in detail with referring to specific examples and attached drawings.

As the rubber used in the present invention, natural rubber, a synthetic polyisoprene rubber or a mixer thereof is preferred, but other diene rubber such as styrene-butadiene copolymer rubber, or polybutadiene rubber may be instead used so long as it is less than 30 parts by weight. If natural rubber, synthetic polyisoprene rubber or the mixture thereof is less than 70 parts by weight, the adhesion to the steel cords is unfavorably lowered.

The cobalt resinate used in the present invention may be obtained through a metathetical reaction between an alkaline metal salt such as sodium or potassium salt of a resin acid, for example, gum rosin, tall oil rosin, wood rosin, formylated rosin, polymerized rosin, disproportionation rosin, hydrogenation rosin or abietic acid, neoabietic acid, palustric acid, levopimaric acid, dehydroabietic acid, dihydroabietic acid, pimaric acid, isopimaric acid and so on and a cobalt salt of a monovalent acid such as cobalt acetate, cobalt iodide, cobalt bromide, cobalt acetate, and the cobalt resinate containing 1–9% of the metal element therein is effective. It is necessary that the cobalt resinate has an oxidation degree of not more than 60%, preferably not more than 40% in the gas chromatography analysis. If the oxidation degree exceeds 60%, the initial stage adhesion to the steel cords is not only lowered, but also the heat aging resistance of rubber is deteriorated. Further, it is necessary that the sulfur concentration in the cobalt resinate is not more than 2,000 ppm, preferably not more than 1,000 ppm. If the sulfur concentration exceeds 2,000 ppm, the heat aging resistance of rubber is unfavorably deteriorated. In addition, it is necessary that the cobalt resinate has a melting point in a range of 140° to 180° C. If the melting point is less than 140° C., the vulcanization rate and the initial stage adhesion are adversely affected, while if it exceeds 180° C., the compatibility to rubber, heat resistance, aging resistance and the initial stage adhesion are unfavorably lowered. Moreover, it is necessary that the undissolved portion of the cobalt resinate in both toluene and water has a sharp characteristic absorption at around 3,600 cm$^{-1}$ in the infrared absorption peak, and respective conspicuous endothermic peaks in temperature ranges of 250° to 350° C. and 300° to 420° C. when elevated at a rate of 5° C./min. in DSC, respectively.

It is now not fully clear what the first endothermic peak in a range of 250° to 350° C. and the characteristic absorption in the infrared absorption spectrum originate from, but this is thought to be due to the phenomenon that crystallization water coordinated to bonding portions of carbonic acid in resin acid and cobalt is removed therefrom, considering that when cobalt sulfate is used as the cobalt salt, such is not seen; in the case of cobalt resinate, it is not seen in the portion soluble in toluene of the cobalt resinate but seen in the undissolved portion only in toluene; the above characteristic absorption disappears in the infrared absorption spectrum of a sample passing through the above endothermic peak in DSC; and so on.

When the cobalt chloride is used as the cobalt salt, the characteristic absorptions at 850, 740, 400 cm$^{-1}$ in the above infrared absorption spectrum which are thought to be due to the removal of chlorine atoms are seen. Thus, it is presumed that a normal salt is formed when a chlorine is further bonded to divalent cobalt bonded to carbonic acid and crystallization water is coordinated thereto. As evident from the following comparative examples, the cobalt resinate having neither the above characteristic absorption nor the first endothermic peak is undesirable due to its poor initial stage adhesion. The second endothermic peak at 300° to 420° C. is due to the decomposition of organic substances.

According to the present invention, the cobalt resinate is blended in an amount of 0.05 to 0.7 part by weight, preferably 0.07 to 0.4 part by weight in terms of the content of the metal element with respect to 100 parts by weight of rubber. If the compounding amount of the cobalt resinate is less than 0.05 part by weight in respect to the content of the cobalt element, the effect due to the addition can not be obtained, while if it is over 0.7 part by weight, undesirably, the adhesion is not only adversely lowered but also the heat aging resistance of rubber is extremely deteriorated. Such a cobalt resinate may be produced in the following manner.

A cobalt salt of a monovalent acid, for instance, an aqueous solution of cobalt chloride, is added to a metal salt of a resin acid, for instance, aqueous solution of sodium gum rosinate at a temperature of not more than 50° C. to proceed the metathetical reaction, thereby producing the cobalt resinate. The resulting metal salt is precipitated without performing extraction with a solvent and separated through mechanical way such as a centrifugal separation or filter press. The resulting cobalt resinate was washed with water, and dried at a temperature of not more than 60° C.

In the present invention, the rubber component may be appropriately added with ordinarily compounding amounts of compounding agents ordinarily used in the rubber industry, for instance, a reinforcing agent or a filler such as carbon black, silica, and calcium carbonate, a softener such as aroma oil, vulcanizer such as fulfur, vulcanization accelerator, vulcanization accelerator acid, and anti-oxidant and so on in addition to the above cobalt resinate, if necessary.

The rubber composition according to the present invention having the above construction is preferably used particularly for the adhesion to the metal. For instance, the rubber composition can be used in a composition for coating the steel belt, steel breaker, steel carcass plies or the like of the tire, but it can be applicable to industrial products other than the tires, for instance, the conveyor belts, vibration resistant rubber, and so on.

The present invention will be described more in detail with reference to the following Synthesis Examples, Examples, and Comparative Examples. Examples are given merely in illustration of the invention, and never interpreted to limit the scope thereof.

Synthesis Example 1

300 g of Chinese gum rosin having properties of an acid value of 170, a softening point of 78° C., and a conjugated diene acid content of 75%, 75 g of 48% aqueous solution of sodium hydroxide and 4,195 g of tap water were charged into a 5,000 ml volume separation type four neck flask equipped with a 100° C. thermometer, a stirrer and a dropping funnel, and a saponification reaction was carried out at a flask inner temperature of 80° to 90° C. for one hour to obtain a metal salt of the Chinese gum rosin having a solid component of 7% and pH 10.3. The thus obtained metal salt was cooled down to an inner temperature of 30° C., and an aqueous solution dissolving 114 g of cobalt chloride in 200 g of tap water was dropwise added thereto through a dropping funnel under stirring in 10 minutes. After the dropping, the metathetical reaction was carried out at 30° C. for 20 minutes under stirring to obtain a slurry containing the cobalt salt of the Chinese gum rosin.

After the slurry liquid was removed at a liquid temperature of 30° C. under a pressure of 4 kg/cm$^2$ by using an experimental filter press, the slurry was repeatedly subjected twice to washing with 1 liter of tap water and drying to obtain the cobalt rosinate having a solid component of 35%.

The cobalt salt was dried in a 40° C. hot-air dryer for 8 hours to obtain 400 g of a cobalt rosinate (Sample A) having a volatile component of 18.2% and a cobalt content of 6.7%.

Synthesis Example 2

Synthesis was carried out under the same conditions as in Synthesis Example 1 except that 300 g of American wood rosin having an acid value of 165, a softening point of 73° C. and a conjugated diene acid content of 67.0% was used instead of the Chinese gum rosin in Synthesis Example 1 and 48% aqueous solution of sodium hydroxide and cobalt chloride were used in amounts of 74 g and 111 g, respectively, thereby obtaining 380 g of a cobalt rosinate (Sample B) having a volatile component of 17.5% and a cobalt content of 6.7%.

Synthesis Example 3

Synthesis was carried out under the same conditions as in Synthesis Example 1 except that tall oil rosin having properties of an acid value of 169.5, a softening point of 76° C. and a conjugated diene acid content of 65% was used instead of the Chinese gum rosin in Synthesis Example 1, thereby obtaining 340 g of a cobalt rosinate (Sample C) having a volatile component of 7% and a cobalt content of 7.6%.

Synthesis Example 4

Synthesis was carried out under the same conditions as in Synthesis Example 1 except that 300 g of abietic acid having properties of an acid value of 183.0 and a conjugated diene acid content of 92% was used instead of the Chinese gum rosin in Synthesis Example 1, and 48% of aqueous solution of sodium hydroxide and cobalt chloride were used in amounts of 82 g and 125 g, respectively, thereby obtaining 390 g of a cobalt rosinate (Sample D) having a volatile component of 19.0% and cobalt content of 7.1%.

Synthesis Example 5

Synthesis was carried out under the same conditions as in Synthesis Example 1 except that 115 g of cobalt acetate was used instead of cobalt chloride in Synthesis Example 1, thereby obtaining 340 g of a cobalt rosinate (Sample E) having properties of a volatile component of 8% and a cobalt content of 7.4%.

Synthesis Example 6

Synthesis was carried out under the same conditions as in Synthesis Example 1 except that disproportionation rosin having properties of an acid value of 158.5, a conjugated diene acid content of 0% and a softening point of 80° C. was used instead of the Chinese gum rosin in Synthesis Example 1, and 48% aqueous solution of sodium hydroxide and cobalt chloride were used in use amounts of 70 g and 106 g, respectively, thereby obtaining 360 g of a cobalt rosinate (Sample F) having a volatile component of 15% and a cobalt content of 6.4%.

Synthesis Example 7

Synthesis was carried out under the same conditions as in Synthesis Example 1 except that 126 g of cobalt sulfide was used instead of cobalt chloride in Synthesis Example 1, thereby obtaining 330 g of a cobalt rosinate (Sample G) having properties of a volatile component of 5% and a cobalt content of 7.8%.

Synthesis Example 8

Synthesis was carried out under the same conditions as in Synthesis Example 1 except that the metathesis temperature was changed from 30° C. in Synthesis Example 1 to 60° C., thereby obtaining 340 g of a cobalt rosinate (Sample H) having properties of a volatile component of 8% and a cobalt content of 7.5%.

Synthesis Example 9

Synthesis was carried out under the same conditions as in Synthesis Example 1 except that the metathesis temperature was changed from 30° C. in Synthesis Example 1 to 80° C., thereby obtaining 320 g of a cobalt rosinate (Sample I) having properties of a volatile component of 4% and a cobalt content of 7.9%.

Synthesis Example 10

Synthesis was carried out under the same conditions as in Synthesis Example 1 except that the use amount of cobalt chloride was changed from 114 g in Synthesis Example 1 to 87 g, thereby obtaining 350 g of a cobalt rosinate (Sample J) having properties of a volatile component of 14% and a cobalt content of 5.5%.

Synthesis Example 11

Synthesis was carried out in the same manner as in Synthesis Example 1 except that after the metathesis reaction, 1 liter of toluene was added; the resulting mixture was transferred to a separatory funnel of 10 liters subsequent to stirring at 30° C. for one hour to divide it into a solvent layer and an aqueous layer; toluene was removed from the solvent layer under the conditions of a vacuum degree of 100 mmHg and a desolvation final temperature of 130° C., thereby obtaining 320 g of a cobalt rosinate (Sample K) having a volatile component of 2% and a cobalt content of 8.0%.

Synthesis Example 12

Synthesis was carried out under the same conditions as in Synthesis Example 1 except that the drying temperature in the hot-air dryer was changed from 30° C. in Synthesis Example 1 to 80° C., thereby obtaining 335 g of a cobalt rosinate (Sample L) having a volatile component of 5% and a cobalt content of 7.8%.

Synthesis Example 13

Synthesis was carried out under the same conditions as in Synthesis Example 1 except that the drying temperature in the hot-air dryer was changed from 30° C. in Synthesis Example 1 to 100° C., thereby obtaining 320 g of a cobalt rosinate (Sample M) having a volatile component of 0.5% and a cobalt content of 8.1%.

Synthesis Example 14

Synthesis was carried out under the same conditions as in Synthesis Example 1 except that 126 g of cobalt sulfate was used instead of cobalt chloride in Synthesis Example 1 and the washing step following the dewatering with filter press was omitted, thereby obtaining 390 g of a cobalt rosinate (Sample N) having a volatile component of 6% and a cobalt content of 7.7%.

With respect to various kinds of the cobalt resinate obtained in Synthesis Examples 1-14, measurements of the oxidation degree, and the melting point, IR analysis of the portion undissolved in toluene and water, DSC analysis and sulfur content analysis were performed. Results obtained are shown in the following Table.

Measuring methods are as follows.
(Oxidation degree)

After the cobalt rosinate was acid decomposed with nitric acid and extracted with ether, the resulting extract was washed with water until the ether layer became neutral, and then dried over sodium sulfate. Then, ether was distilled off under reduced pressure at 40° C., and a specified amount of margaric acid (purity 98%) was added to the remainder. Thereafter, the GLC analysis was carried out after the methylesterification according to diazomethane method.

| GLC conditions | |
|---|---|
| column | DEGS-20% |
| column temperature | 205° C. |
| detector | FID |

The rosin acid value after the acid decomposition was determined according to a neutralization-titration with potassium hydroxide.

Figure 2:
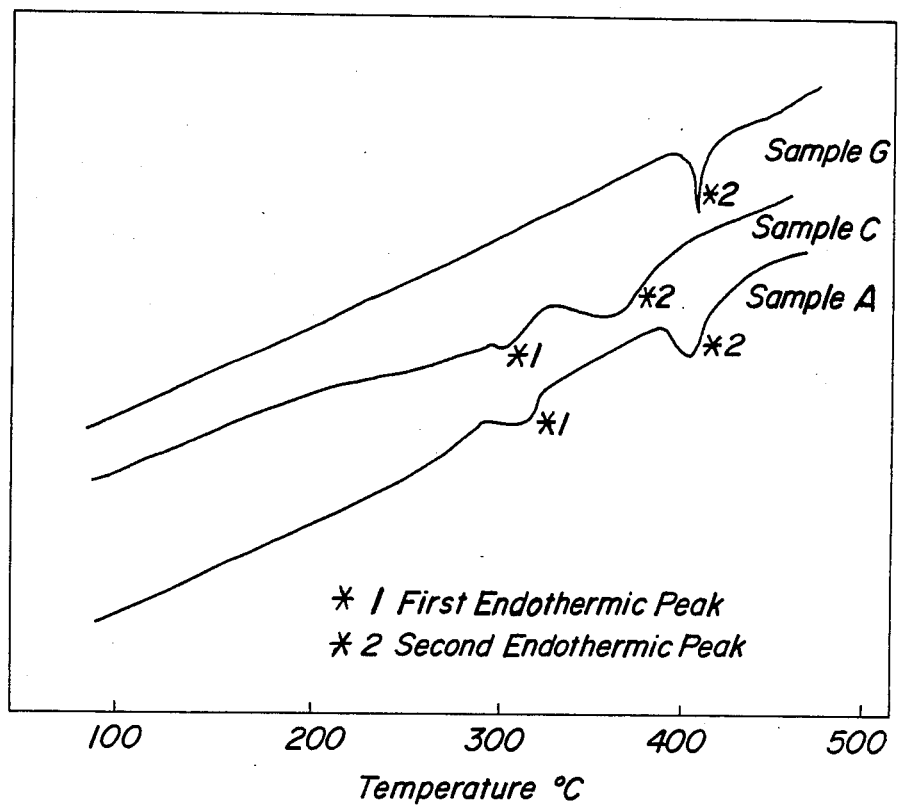
FIG. 2 is a DSC curve diagram showing Sample A, Sample C and Sample G.

The oxidation degree was determined according to the following formulae:

15,000 rpm for 10 minutes to separate a toluene-dissolved portion. Further, toluene was added to the remaining water portion, which, after stirring, was repeatedly subjected to the centrifugal separation until the toluene portion became transparent. A toluene-water undissolved portion was filtered and dried under reduced pressure. Toluene was distilled off from the toluene-dissolved portion under reduced pressure in an evaporator. With respect to the toluene-water undissolved portion, IR analysis and DSC measurement at a temperature raising rate of 5° C./min. were carried out. For reference purpose, IR spectra of Sample A and Sample C, and DSC curves of Sample A, Sample C and Sample G are shown in FIG. 1 and FIG. 2, respectively.

(Content of sulfur in cobalt resinate)

Organic sulfur was measured by means of Dorman fine amount electric amount titration apparatus.

TABLE 1(a)

| | Sample No. | | | | | | |
|---|---|---|---|---|---|---|---|
| | A | B | C | D | E | F | G |
| Raw inorganic cobalt salt | $CoCl_2$ | $CoCl_2$ | $CoCl_2$ | $CoCl_2$ | CoAc | $CoCl_2$ | $CoSO_4$ |
| Raw resin acid | gum rosin | wood rosin | tall rosin | abietic acid | gum rosin | dispropor- tionation rosin | gum rosin |
| 3,600 cm$^{-1}$ characteristic absorption in IR analysis | present | present | present | present | prsesnt | present | absent |
| First endothermic peak in DSC (°C.) | about 310 | about 300 | about 300 | about 310 | about 300 | about 300 | absent |
| Second endothermic peak in DSC (°C.) | about 400 | about 400 | about 350 | about 380 | about 400 | about 410 | about 410 |
| Sulfur content (ppm) | 660 | 950 | 1800 | 420 | 580 | 600 | 1700 |
| Oxidation degree (°C.) | 26.1 | 28.5 | 31.6 | 27.0 | 30.5 | 15.8 | 35.8 |
| Melting point (°C.) | 170 | 165 | 175 | 173 | 162 | 174 | 195 |

TABLE 1(b)

| | Sample No. | | | | | | |
|---|---|---|---|---|---|---|---|
| | H | I | J | K | L | M | N |
| Raw inorganic cobalt salt | $CoCl_2$ | $CoCl_2$ | $CoCl_2$ | $CoCl_2$ | $CoCl_2$ | $CoCl_2$ | $CoSO_4$ |
| Raw resin acid | gum rosin | gum rosin | gum rosin | gum rosin | gum rosin | gum rosin | gum rosin |
| 3,600 cm$^{-1}$ characteristic absorption in IR analysis | absent | absent | present | absent | absent | absent | absent |
| First endothermic peak in DSC (°C.) | absent | absent | about 300 | absent | absent | absent | absent |
| Second endothermic peak in DSC (°C.) | about 410 | about 410 | about 380 | about 400 | about 410 | about 410 | about 400 |
| Sulfur content (ppm) | 600 | 700 | 580 | 580 | 540 | 540 | 2300 |
| Oxidation degree (°C.) | 35.1 | 37.3 | 30.5 | 21.5 | 63.5 | 70.5 | 48.5 |
| Melting point (°C.) | 205 | 210 | 130 | 199 | 210 | 220 | 205 |

$$\text{Acid converting rate} = \frac{\text{acid value of acid-decomposed rosin}}{\text{acid value of starting rosin}}$$

Theoretical value (%) of margaric acid =

$$\left[ \frac{0.98 \times \text{sampling amount of margaric acid}}{\begin{array}{c} \text{sampling amount} \\ \text{of acid-} \\ \text{decomposed rosin} \end{array} \times \begin{array}{c} \text{acid} \\ \text{converting} \\ \text{rate} \end{array} + \begin{array}{c} \text{sampling amount} \\ \text{of margaric} \\ \text{acid} \end{array}} \right] \times 100$$

Oxidation degree (%) =

$$\left[ 1 - \left( \frac{\text{theoretical value (\%) of margaric acid}}{\text{margaric acid (\%) in GLC analysis}} \right) \right] \times 100$$

(Melting point)

Melting point was measured according to JIS K0064.

(IR analysis, DSC analysis)

After toluene was added to cobalt rosinate in a test tube, and dissolved thereinto at 25° C. for 2 hours under shaking. Shaking was well-done after the addition of water, and centrifugal separation was carried out at Examples 1–6 and Comparative Examples 1–9

Various rubber compositions were prepared by kneading various kinds of cobalt resinates shown in Table 1 into 80 parts by weight of natural rubber and 20 parts by weight of a synthetic polyisoprene rubber (IR 2200), 50 parts by weight of HAF carbon black, 1 part by weight of N-(1,3-dimethylbutyl)-N'-phenyl-p-phenylenediamine, 2 parts by weight of aroma oil 8 parts by weight of zinc oxide, 0.5 part by weight of N-oxydiethylene-2-benzothiazole sulfene amide, 5 parts by weight of N-oxydiethylene-2-benzothiazole sulfene amide and 5 parts by weight of sulfur by means of a Banbury mixer such that the content of the cobalt resinate may be 0.2 part by weight in terms of cobalt element. With respect to the thus obtained rubber compositions, the initial stage adhesion and heat aging properties are evaluated. Results obtained are shown in FIG. 2. For comparison purpose, evaluation was simultaneously made on a case in which the cobalt element content of cobalt naphthenate was made the same as above, and results obtained are shown in Table 2.

The initial stage adhesion and the heat aging performance were evaluated as follows:

(Initial stage adhesion)

A steel cord of 1×5×0.23 surface-plated with brass was buried into an unvulcanized rubber, and vulcanization was carried out at 145° C. for 30 minutes. Then, a peeling-off test between the steel cord and the buried rubber layers was carried out according to a JIS K6301 to evaluate the adhesion based on an amount of rubber left on the cord. Evaluation was made assuming that the state in which the cord was completely covered with the rubber was taken as 100, while a state in which the cord had no rubber attached thereto was taken as "0".

(Heat aging resistance properties)

Tensile strength was measured according to JIS K6301 by using a rubber sheet which was obtained by vulcanizing a nonvulcanized rubber composition at 145° C. for 30 minutes. After the rubber sheet was thermally aged in a gear oven at 100° C. for 24 hours, tensile strength was similarly measured. The heat aging properties were evaluated based on a hold rate of the tensile strength.

Hold rate (%) of tensile strength after heat aging =

$$\frac{\text{tensile strength after heat aging}}{\text{tensile strength before heat aging}} \times 100$$

TABLE 2

|  | Example |  |  |  |  |  | Comparative Example |  |  |  |  |  |  |  |  |
|---|---|---|---|---|---|---|---|---|---|---|---|---|---|---|---|
|  | 1 | 2 | 3 | 4 | 5 | 6 | 1 | 2 | 3 | 4 | 5 | 6 | 7 | 8 | 9 |
| Sample signal of cobalt salt | A | B | C | D | E | F | G | H | I | J | K | L | M | N | cobalt naphthenate |
| Initial stage adhesion | 100 | 100 | 98 | 100 | 99 | 96 | 80 | 90 | 89 | 92 | 85 | 81 | 73 | 75 | 95 |
| Heat aging resistance (hold rate %) | 75 | 73 | 70 | 75 | 74 | 75 | 70 | 70 | 69 | 70 | 68 | 69 | 63 | 61 | 59 |

As evident from Table 2, the rubber compositions according to the present invention in which are blended specific cobalt resinates in shown in Examples are remarkably improved with respect to the initial stage adhesion and heat aging resistance.

As mentioned in the above, the rubber composition according to the present invention is so constituted that the cobalt resinate specified above is added in an amount of 0.05 to 0.7 part by weight with respect to 100 parts by weight of rubber containing at not less than 70 parts by weight of at least one kind of rubbers of natural rubber and a synthetic polyisoprene rubber. Thereby, the rubber composition is conspicuously improved in respect to the initial stage adhesion and heat aging resistance, and therefore is extremely useful for the rubber coating the steel cords.

What is claimed is:

1. A rubber composition in which a metal salt between a resin acid and cobalt is blended in a content of from 0.05 to 0.7 part by weight in terms of the content of a metal element with respect to 100 parts by weight of rubber containing not less than 70% by weight of at least one rubber of natural rubber and a synthetic polyisoprene rubber; as the metal salt is used a cobalt resinate which has a melting point in a range of 140° to 180° C., an oxidation degree of not more than 60% in a gas chromatography (GLC), and not more than 2,000 ppm of a sulfur concentration in the metal salt; when the metal salt is divided into a dissolved portion and an undissolved portion by using toluene and water, the undissolved portion in both toluene and water has a characteristic absorption around 3,600 cm$^{-1}$ in an infrared absorption spectrum (IR); and when elevated in temperature at a rate of 5° C./min. in a differential scanning calorimeter (DSC), the cobalt resinate has endothermic peaks in ranges of 250° to 350° C. and 300° to 420° C., respectively.

2. A rubber composition according to claim 1, wherein the metal salt between the resin acid and cobalt is 0.07 to 0.4 part by weight in terms of the content of the metal element with respect to 100 parts by weight of the rubber.

3. A rubber composition according to claim 1, wherein the oxidation degree is not more than 40%.

4. A rubber composition according to claim 1, wherein the sulfur content is not more than 1,000 ppm.

* * * * *